United States Patent [19]

Gutu-Nelle et al.

[11] Patent Number: 4,810,275
[45] Date of Patent: Mar. 7, 1989

[54] METHOD OF MAKING OPTICAL WAVEGUIDES USING GLASS FORMING PULVERULENT MATERIAL

[75] Inventors: Anca Gutu-Nelle, Stuttgart; Armin Baumgartner, Ludwigsburg, both of Fed. Rep. of Germany

[73] Assignee: Alcatel NV, Amsterdam, Netherlands

[21] Appl. No.: 74,340

[22] Filed: Jul. 16, 1987

[30] Foreign Application Priority Data

Jul. 23, 1986 [DE] Fed. Rep. of Germany ....... 3624918

[51] Int. Cl.⁴ ..................... C03B 19/06; C03B 37/012
[52] U.S. Cl. ........................................... 65/2; 65/18.1; 65/900; 65/32.1; 264/120; 264/500
[58] Field of Search ............... 65/2, 18.1, 32, 900, 65/3.1, 3.11; 264/517, 120, 121, 500

[56] References Cited

U.S. PATENT DOCUMENTS

| 2,378,539 | 6/1945 | Dawihl ..................... 264/500 X |
| 2,714,227 | 8/1955 | Graham ..................... 65/18.1 |
| 3,586,067 | 6/1971 | Jorgensen ..................... 264/121 |
| 4,154,592 | 5/1979 | Bailey ..................... 65/32 |
| 4,208,367 | 6/1980 | Wunning ..................... 264/125 |
| 4,409,171 | 10/1983 | Leon ..................... 264/120 |
| 4,473,526 | 9/1984 | Buhler ..................... 264/517 |
| 4,620,862 | 11/1986 | Dorn ..................... 65/18.1 |
| 4,661,136 | 4/1987 | Dorn ..................... 264/120 X |

FOREIGN PATENT DOCUMENTS

| 153619 | 9/1985 | European Pat. Off. ............. 65/18.1 |
| 51-67309 | 6/1976 | Japan ..................... 65/18.1 |
| 58-217441 | 12/1983 | Japan ..................... 65/900 |

Primary Examiner—Kenneth M. Schor
Attorney, Agent, or Firm—Peter C. Van Der Sluys

[57] ABSTRACT

A method of making optical waveguides is disclosed in which, to fabricate a preform, glass forming pulverulent material is filled into a mold by means of one or more screw conveyors. The quantity of glass forming pulverulent material filled into the mold per unit of time is increased by passing a suitable gas through the apparatus. Thus, the quantity conveyed per unit of time can also be controlled by adjusting the gas pressure. By using a dry gas, the moisture content of the powder can be reduced.

9 Claims, 1 Drawing Sheet

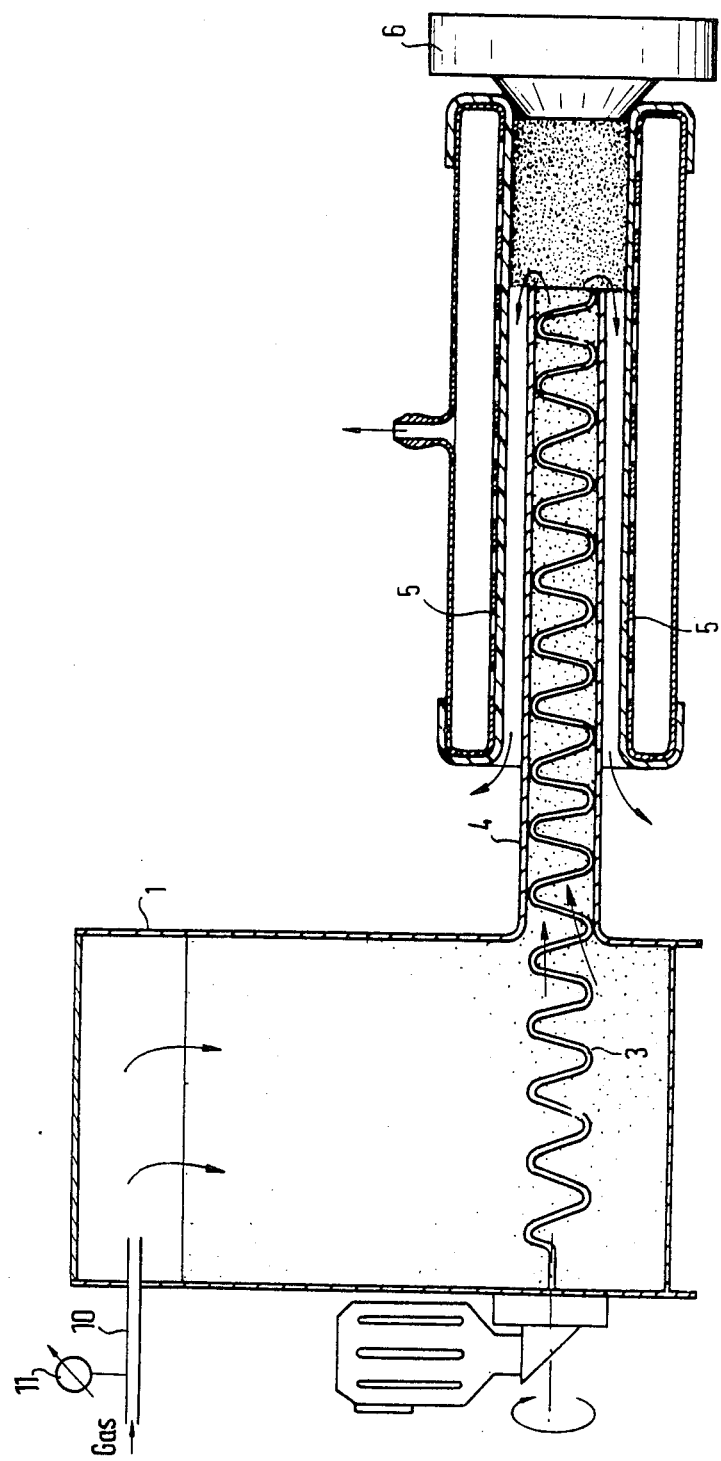

METHOD OF MAKING OPTICAL WAVEGUIDES USING GLASS FORMING PULVERULENT MATERIAL

BACKGROUND OF THE INVENTION

Field of the Invention

The present invention relates to a method for making optical waveguides and more particularly to a method of making an optical waveguide preform.

Description of the Prior Art

In EP-A2-0 153 619 corresponding to U.S. Pat. Nos. 4,620,862 and 4,661,136 there is disclosed a method of fabricating a preform wherein pulverulent material is filled into a mold under pre-compaction using a screw conveyor. The conveying speed, or, more precisely, the quantity of pulverulent material conveyed per unit of time, is determined by the speed of the screw conveyor.

SUMMARY OF THE INVENTION

It is an object of the present invention to provide a method of the above kind in which the quantity of pulverulent material conveyed per unit of time can be additionally determined by other means.

It is a further object of the invention to control the quantity of pulverulent material conveyed per unit time by passing a gas through said material.

The above objects are realized by a method in which glass forming pulverulent material is filled into a mold by means of one or more screw conveyors. The quantity of glass forming pulverulent material filled into the mold per unit of time is increased by passing a suitable gas through the apparatus. Thus, the quantity conveyed per unit of time can also be controlled by adjusting the gas pressure. By using a dry gas, the moisture content of the powder can be reduced.

DESCRIPTION OF THE DRAWING

The drawing is a vertical section of an apparatus for filling the glass forming pulverulent material into a mold by the method in accordance with the invention.

DESCRIPTION OF THE PREFERRED EMBODIMENT

With the exception of some minor changes, the apparatus shown in the drawing is identical to the one described in EP-A2-0 153 619, the printed publication mentioned above. The dhanges are as follows:

1. In its upper portion, which is not filled with the glass forming pulverulent material, the supply vessel 1, which contains the glass forming pulverulent material and which is sealed against the ambient atmosphere, has a gas inlet pipe 10 which is provided with a pressure gauge 11 for measuring and displaying the gas pressure in the upper portion of the supply vessel.
2. The conveyor tube 4 projects freely into the mold 5, i.e., the sealing ring 8, which is provided in the prior art apparatus at the front end of the conveyor tube 4 and which seals the space between the conveyor tube 4 and the mold 5 against the atmosphere, is no longer present. (The size of the space between the conveyor tube 4 and the mold 5 is exaggerated in the drawing.)

During the filling process, a gas whose properties will be described later is admitted to the gas inlet pipe 10 under a constant, controllable pressure. As indicated by the arrows, this gas flows through the glass forming pulverulent material in the supply vessel 1, thence into the conveyor tube 4, emerges from the latter at the front and leaves the apparatus through the space between the conveyor tube 4 and the mold 5.

The gas flowing through the apparatus as described above increases the quantity of pulverulent material conveyed per unit of time to a value which lies above a value determined by the structural design and the speed of the screw conveyor 3. The quantity of pulverulent material conveyed per unit of time, and thus the quantity of pulverulent material filled into the mold per unit of time, can thus be set by adjusting the quantity of gas flowing through the apparatus per unit of time in such a manner that the desired quantity of pulverulent material is conveyed.

The amount of gas flowing in per unit of time is adjusted via the gas pressure in the supply vessel, since this gas pressure determines the amount of gas flowing per unit of time. The gas pressure is kept at a suitable constant value by manual adjustment or by an automatic pressure control device (not shown). Suitable pressures range from 500 to 10 mbars.

Passing the gas through the apparatus has the following advantages:

If the average density of the pulverulent material filled into the mold 5 is to be increased, the counterforce acting on the cover 6 must be increased. However, this reduces the quantity of pulverulent material filled into the mold per unit of time. To compensate for this, the gas pressure can be increased.

If a dry gas is used, any residual moisture in the glass forming pulverulent material can be removed since such moisture is absorbed by the dry gas flowing through the pulverulent material and leaves the apparatus together with this gas.

Preferably, a gas is used which is not only dry but also as pure as possible, so that the quality of the glass forming pulverulent material is not impaired by impurities, particularly in the form of metals and transition metals.

So far, the use of dry, pure helium has produced good results, and, as a result of the gas flow, the quantity of pulverulent material filled into the mold per unit of time has been increased by a factor of 4.

Although the space between the mold 5 and the conveyor tube 4 is not sealed, the pulverulent material filled into the mold is protected against atmospheric influences, since the gas emerging from the space between the conveyor tube 4 and the mold 5 prevents the ingress of air or any impurities contained therein.

Should it be necessary to use a slide ring or the like between the conveyor tube 4 and the inside wall of the mold 5 to ensure that the conveyor tube is guided in a defined manner within the mold 5, the ring could be made of any material which allows the gas to flow through.

The method described above for passing gas through powders when filling the latter into a mold can also be used in other methods of filling powders into molds, particularly in the method proposed in the prior German Patent Application No. P 35 18 142, U.S. patent application Ser. No. 102,294, filed Sept. 25, 1987, in which the mold is not a pre-expanded flexible hose as in the printed publication, but a silica glass tube. The present invention in this embodiment of the method is precisely analogous to the previous embodiments, so it need not be explained separately. For a description of the apparatus shown in the figure of German Patent Application No. P 35 18 142, reference should be made to the printed publication.

What is claimed is:

1. In a method of making a preform for the fabrication of optical waveguides wherein glass forming pulverulent material is filled into one end of a mold and compacted into the mold against a force acting on the mold in a direction opposite the direction of filling by means of a screw conveyor inserted into the mold and withdrawn as the mold is filled with compacted material, the improvement comprising the step of passing a gas through the glass forming pulverulent material conveyed with the screw conveyor, whereby the pressure of the gas passed through the material is regulated to control the amount of material provided to the mold such that the quantity of glass forming pulverulent material provided to the mold per unit time is increased to a value greater than would be obtained in absence of said step of passing a gas.

2. A method as claimed in claim 1, wherein the gas in both dry and pure.

3. A method as claimed in claim 2, wherein the gas is helium.

4. A method as claimed in claim 1, wherein the gas is provided at a constant pressure.

5. A method as claimed in claim 4, wherein the constant pressure is in a range from 500 to 10 mbars.

6. A method as claimed in claim 2, wherein the gas is provided at a constant pressure.

7. A method as claimed in claim 6, wherein the constant pressure is in a range from 500 to 10 mbars.

8. A method as claimed in claim 3, wherein the gas is provided at a constant pressure.

9. A method as claimed in claim 8, wherein the constant pressure is in a range from 500 to 10 mbars.

* * * * *